(12) United States Patent
Stenneth et al.

(10) Patent No.: US 11,897,478 B2
(45) Date of Patent: Feb. 13, 2024

(54) METHOD, APPARATUS AND COMPUTER PROGRAM PRODUCT FOR DETERMINING THE PRESENCE OF PRECIPITATION

(71) Applicant: HERE GLOBAL B.V., Eindhoven (NL)

(72) Inventors: Leon Stenneth, Chicago, IL (US); Bruce Bernhardt, Chicago, IL (US); Advait Raut, Mumbai (IN)

(73) Assignee: HERE GLOBAL B.V., Eindhoven (NL)

( * ) Notice: Subject to any disclaimer, the term of this patent is extended or adjusted under 35 U.S.C. 154(b) by 125 days.

(21) Appl. No.: 17/302,849

(22) Filed: May 13, 2021

(65) Prior Publication Data
US 2022/0363260 A1    Nov. 17, 2022

(51) Int. Cl.
*B60W 40/02*    (2006.01)
*B60W 30/182*   (2020.01)
(Continued)

(52) U.S. Cl.
CPC ........ *B60W 10/02* (2013.01); *B60W 30/0956* (2013.01); *B60W 30/182* (2013.01);
(Continued)

(58) Field of Classification Search
CPC ............. B60W 40/02; B60W 30/0956; B60W 30/182; B60W 2552/40; B60W 2555/20;
(Continued)

(56) References Cited

U.S. PATENT DOCUMENTS 5,773,946 A * 6/1998 Montero ............... B60S 1/0822
                                                        318/483
10,081,335 B1 * 9/2018 Wheeler ............... B60S 1/0881
(Continued)

FOREIGN PATENT DOCUMENTS

JP    H 06245289 A    9/1994
KR    20160059179 A   5/2016

OTHER PUBLICATIONS

Guo et al., "Tefnut: An Accurate Smartphone Based Rain Detection System in Vehicles", International Conference on Wireless Algorithms, Systems, and Applications, (Aug. 4, 2016), 8 pages.

*Primary Examiner* — Jeff A Burke
*Assistant Examiner* — Mohamad O El Sayah
(74) *Attorney, Agent, or Firm* — ALSTON & BIRD LLP

(57) ABSTRACT

Embodiments described herein provide a method for using one or more audio signals from one or more sensors to establish the presence and severity of precipitation at a particular location. Methods may include: receiving at least one first audio signal from a first audio sensor of a vehicle; extracting acoustical features including frequency and amplitude from the at least one first audio signal; receiving at least one second audio signal from a second audio sensor of the vehicle; extracting acoustical features including frequency and amplitude from the at least one second audio signal; processing the frequency and amplitude from the at least one first audio signal and the frequency and amplitude from the at least one second audio signal as inputs to an algorithm to generate an output from the algorithm; and determining, from the output of the algorithm, a precipitation condition and a confidence measure of the precipitation condition.

17 Claims, 3 Drawing Sheets

(51) Int. Cl.
  *B60W 30/095* (2012.01)
  *B60W 10/02* (2006.01)
(52) U.S. Cl.
  CPC ..... *B60W 2420/54* (2013.01); *B60W 2552/40* (2020.02); *B60W 2555/20* (2020.02); *B60W 2720/28* (2013.01); *B60W 2720/30* (2013.01)
(58) Field of Classification Search
  CPC ......... B60W 2420/54; B60W 2720/28; B60W 2720/30
  See application file for complete search history.

(56) References Cited

U.S. PATENT DOCUMENTS

| | | | |
|---|---|---|---|
| 10,373,611 | B2 | 8/2019 | Jeyachandran et al. |
| 2013/0145839 | A1* | 6/2013 | Niemann ........... G01N 29/2437 73/170.17 |
| 2016/0327687 | A1* | 11/2016 | Nylander ................ G01W 1/14 |
| 2016/0369728 | A1* | 12/2016 | Surnilla ........... F02M 35/10393 |
| 2018/0059677 | A1* | 3/2018 | Zhao ..................... G06V 20/56 |
| 2019/0051172 | A1* | 2/2019 | Stenneth ................ G08G 1/166 |
| 2020/0031337 | A1 | 1/2020 | Soltanian et al. |
| 2020/0160626 | A1* | 5/2020 | Lei ....................... G07C 5/0808 |
| 2022/0185313 | A1* | 6/2022 | Wang .................... G06V 20/56 |
| 2022/0269892 | A1* | 8/2022 | Huang ................... G06F 3/013 |

* cited by examiner

METHOD, APPARATUS AND COMPUTER PROGRAM PRODUCT FOR DETERMINING THE PRESENCE OF PRECIPITATION

TECHNOLOGICAL FIELD

An example embodiment of the present invention relates generally to determining the presence of precipitation, and more particularly, for using one or more audio signals from one or more sensors to establish the presence and severity of precipitation at a particular location.

BACKGROUND

Weather stations may be used to gather information regarding weather-related information at geographically dispersed locations, such that the weather information may be used for historical trend data, current weather reporting, and future weather prediction. Weather stations may include various sensors to gather weather-related information and report an abundance of weather attributes, such as temperature, humidity, barometric pressure, visibility, precipitation, wind speed, wind direction, etc. Weather stations traditionally have included stationary apparatus that included various types of specifically configured sensors to gather weather-related data. These traditional weather stations are conventionally located at airports, military bases, remote outposts, etc. However, certain regions may lack weather stations close by such that weather for an area may not be readily available and of questionable accuracy.

One drawback of using location-based weather data from weather stations is that the weather data may only approximate the weather at a location in which a user is interested. The ubiquity of weather stations may result in an abundance of weather-related information, much of which may not be material to the desired weather information. More granular weather estimations may be provided by crowd-sourced sensors; however, weather data crowd-sourced from sensors within an area may erroneously report conditions resulting in false-positives for adverse weather conditions.

BRIEF SUMMARY

A method, apparatus, and computer program product are therefore provided for determining the presence of precipitation, and more particularly, for using one or more audio signals from one or more sensors to establish the presence and severity of precipitation at a particular location. An apparatus may be provided including at least one processor and at least one non-transitory memory including computer program code instructions, the computer program code instructions may be configured to, when executed, cause the apparatus to at least: receive at least one first audio signal from a first audio sensor of a vehicle; extract acoustical features including frequency and amplitude from the at least one first audio signal; receive at least one second audio signal from a second audio sensor of the vehicle; extract acoustical features including frequency and amplitude from the at least one second audio signal; process the frequency and amplitude from the at least one first audio signal and the frequency and amplitude of the at least one second audio signal as inputs to an algorithm to generate an output from the algorithm; and determine, from the output of the algorithm, a precipitation condition and a confidence measure of the precipitation condition.

According to some embodiments, the apparatus is further caused to determine a location of the vehicle and identify an area of the precipitation condition based on the location of the vehicle. The apparatus of some embodiments is further caused to provide for a change in an operational state of the vehicle in response to the determination of the precipitation condition. The operational state of the vehicle may include a traction control sensitivity or a power distribution to the wheels. The apparatus of some embodiments is caused to determine, from the output of the algorithm, a severity measure of the precipitation condition. The confidence measure of the precipitation condition may be determined based, at least in part, on a combination of the at least one first audio signal and the at least one second audio signal. The apparatus of some embodiments is further caused to transmit an indication of the precipitation condition and the severity measure of the precipitation condition together with a location of the precipitation condition to a service provider in response to the confidence measure satisfying a predetermined level.

Embodiments provided herein may include a computer program product having at least one non-transitory computer-readable storage medium having computer-executable program code instructions stored therein, the computer executable program code instructions including program code instructions to: receive at least one first audio signal from a first audio sensor of a vehicle; extract acoustical features including frequency and amplitude from the at least one first audio signal; receive at least one second audio signal from a second audio sensor of the vehicle; extract acoustic features including frequency and amplitude from the at least one second audio signal; process the frequency and amplitude from the at least one first audio signal and the frequency and amplitude from the at least one second audio signal as inputs to an algorithm to generate an output from the algorithm; and determine, from the output of the algorithm, a precipitation condition and a confidence measure of the precipitation condition.

The computer program product of some embodiments further includes program code instructions to determine a location of the vehicle and identify an area of the precipitation condition based on the location of the vehicle. Embodiments may include program code instructions to provide for a change in an operational state of the vehicle in response to the determination of the precipitation condition. The operational state of the vehicle may include a traction control sensitivity or a power distribution to the wheels. Embodiments may include program code instructions to determine, from the output of the algorithm, a severity measure of the precipitation condition. The confidence measure of the precipitation condition may be determined based, at least in part, on a combination of the at least one first audio signal and the at least one second audio signal. Embodiments may include program code instructions to transmit an indication of the precipitation condition and the severity measure of the precipitation condition together with a location of the precipitation condition to a service provider in response to the confidence measure satisfying a predetermined level.

Embodiments provided herein may include a method including: receiving at least one first audio signal from a first audio sensor of a vehicle; extracting acoustical features including frequency and amplitude from the at least one first audio signal; receiving at least one second audio signal from a second audio sensor of the vehicle; extracting acoustical features including frequency and amplitude from the at least one second audio signal; processing the frequency and amplitude from the at least one first audio signal and the frequency and amplitude from the at least one second audio signal as inputs to an algorithm to generate an output from the algorithm; and determining, from the output of the algorithm, a precipitation condition and a confidence measure of the precipitation condition.

Methods of some embodiments include determining a location of a vehicle and identifying an area of the precipitation condition based on the location of the vehicle. Methods of some embodiments include providing for a change in an operational state of the vehicle in response to the determination of the precipitation condition. The operational state of the vehicle may include a traction control sensitivity or a power distribution to the wheels. Methods of some embodiments include determining, from the output of the algorithm, a severity measure of the precipitation condition. The confidence measure of the precipitation condition may be determined based, at least in part, on a combination of the at least one first audio signal and the at least one second audio signal.

Embodiments provided herein may include an apparatus including: means for receiving at least one first audio signal from a first audio sensor of a vehicle; means for extracting acoustical features including frequency and amplitude from the at least one first audio signal; means for receiving at least one second audio signal from a second audio sensor of the vehicle; means for extracting acoustical features including frequency and amplitude from the at least one second audio signal; means for processing the frequency and amplitude from the at least one first audio signal and the frequency and amplitude from the at least one second audio signal as inputs to an algorithm to generate an output from the algorithm; and means for determining, from the output of the algorithm, a precipitation condition and a confidence measure of the precipitation condition.

The apparatus of some embodiments includes means for determining a location of a vehicle and means for identifying an area of the precipitation condition based on the location of the vehicle. The apparatus of some embodiments includes means for providing for a change in an operational state of the vehicle in response to the determination of the precipitation condition. The operational state of the vehicle may include a traction control sensitivity or a power distribution to the wheels. The apparatus of some embodiments includes means for determining, from the output of the algorithm, a severity measure of the precipitation condition. The confidence measure of the precipitation condition may be determined based, at least in part, on a combination of the at least one first audio signal and the at least one second audio signal.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
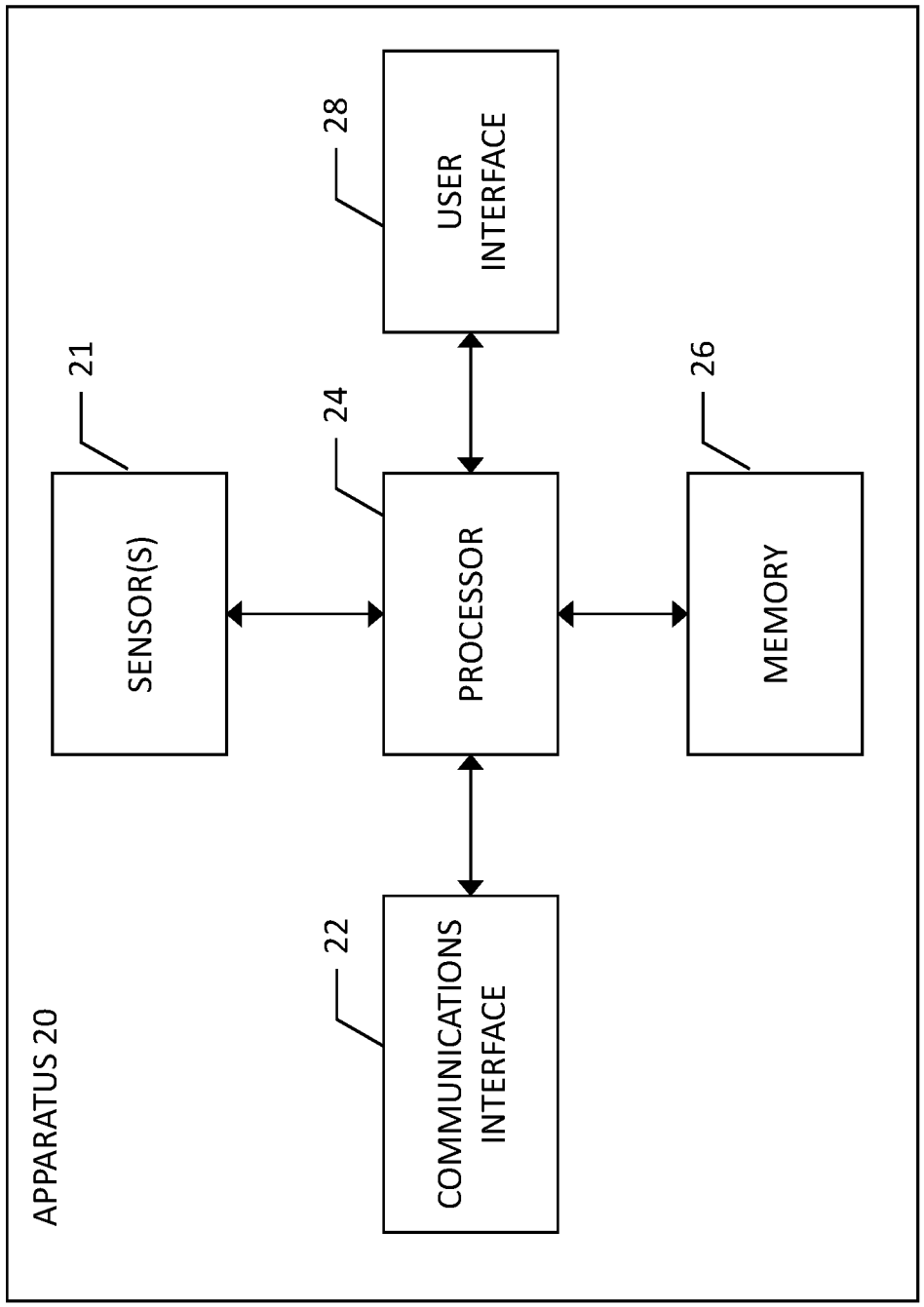
Figure 2:
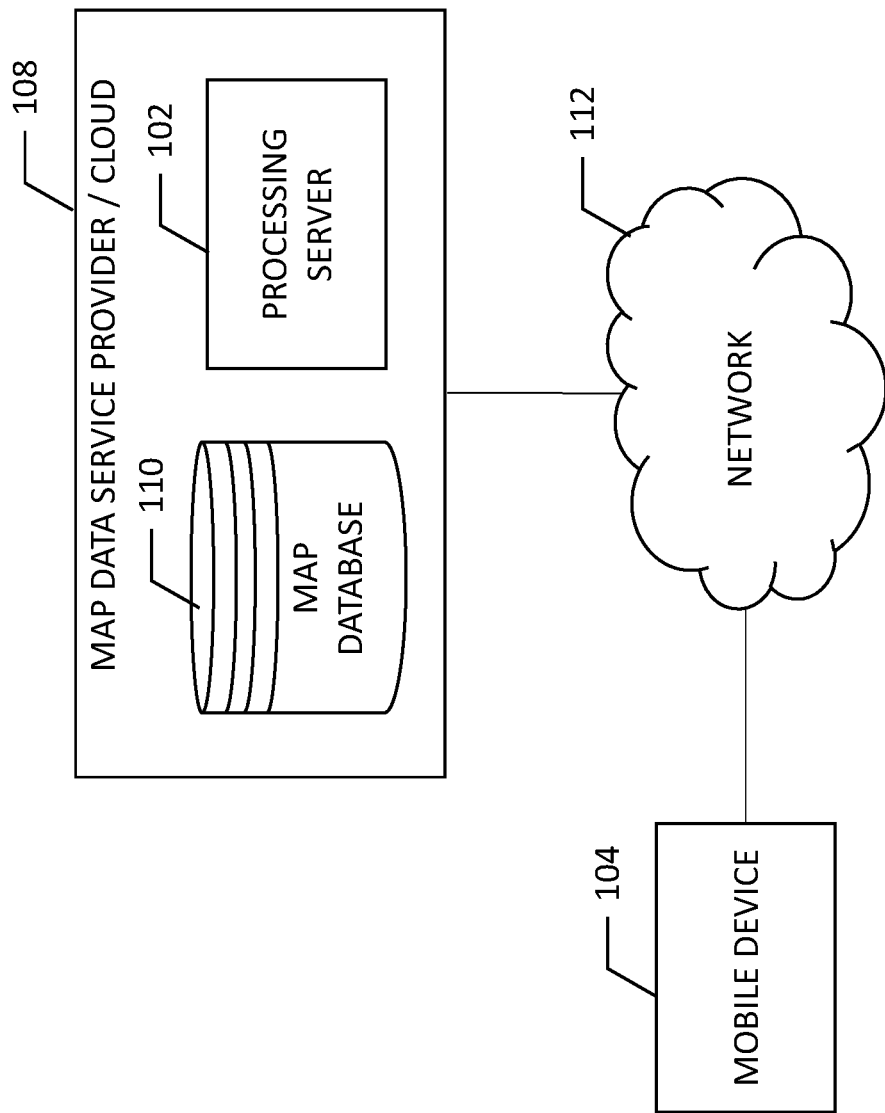
Figure 3:
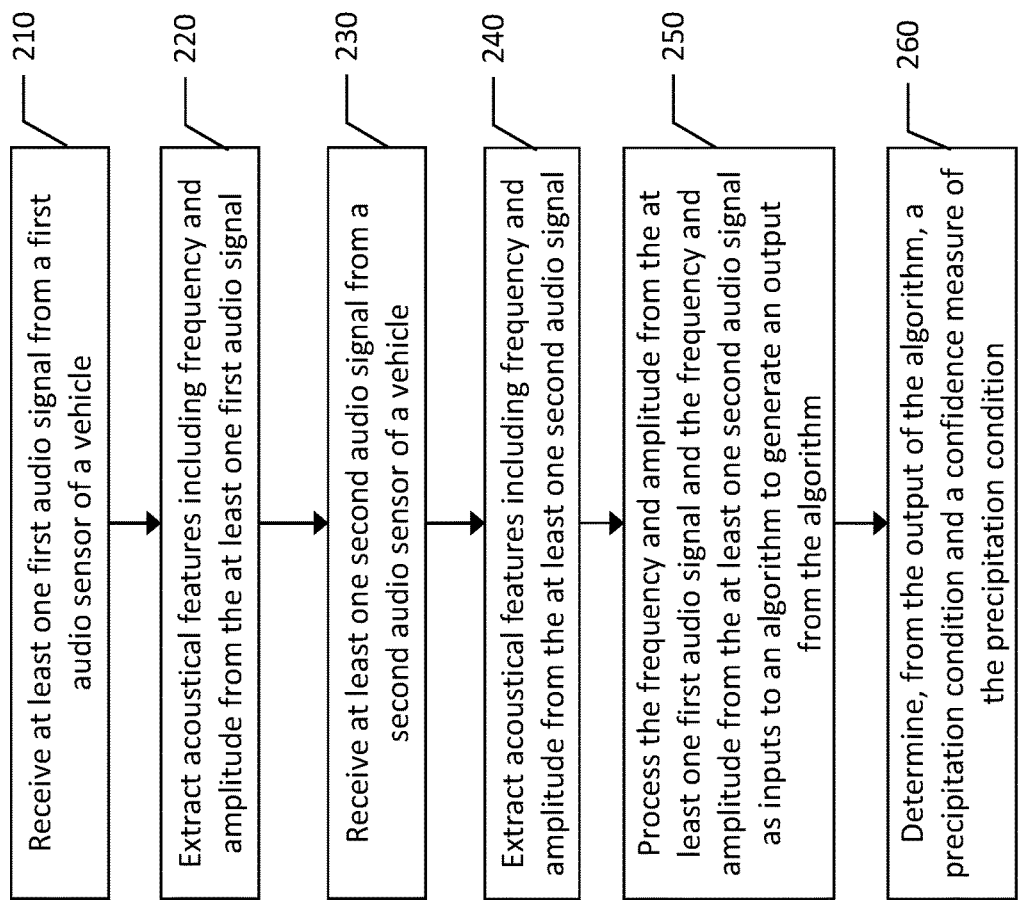

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for determining the presence and severity of precipitation according to an example embodiment of the present disclosure; and FIG. 3 is a flowchart of a method for determining the presence and severity of precipitation according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present invention for determining the presence of precipitation, and more particularly, for using one or more audio signals from one or more sensors to establish the presence and severity of precipitation at a particular location. Embodiments described herein receive audio signals from different locations in a vehicle such that a plurality of audio sensors may be employed. Audio sensors are configured to capture audio from a candidate vehicle such as from a windshield wiper blade moving on a windshield, raindrops or hail striking the windshield, roof, or hood, vehicle tires splashing in water on a road surface, sounds of thunder, neighboring vehicle tires splashing in water on the road surface, and water being splashed onto the candidate vehicle from other sources. The identification of precipitation and its severity can be used to update hazardous conditions on a road segment within a network of roads. These hazard warnings can be employed by various systems to take corrective or evasive actions depending upon the condition.

Hazardous conditions may be identified in regions on a map, such as in polygons of a map together with the nature of the hazardous condition and the severity of the hazardous condition. In this regard, a user interface of a device, such a mobile device or a device affixed to a vehicle, such as to a dashboard or the like, may provide hazard warnings to a user, which may aid the user in navigation or driving in an instance in which the user is traveling by vehicle. The display of a device such as a navigation system may provide information to a driver about hazards at or near their current location or hazards that are upcoming along their route or potential route. Further, such hazard warnings may be used by autonomous vehicle controls to provide some degree of control responsive to the hazardous condition identified. An autonomous vehicle may cede control to a driver based on the presence of a hazardous condition, or may re-route to avoid a hazardous condition when possible and appropriate. Embodiments described herein provide a method for establishing these hazardous conditions in the form of precipitation conditions together with a location of the condition, a severity of the condition, and a degree of confidence of the reported condition.

As described herein, example embodiments of the claims may provide for determining the presence of precipitation, and more particularly, for using one or more audio signals from one or more sensors to establish the presence and severity of precipitation at a particular location. The determination of precipitation as a hazardous condition together with severity may be provided to a user via any available device, such as a mobile phone, tablet computer, fixed computer (e.g., desktop computer), in vehicle microphones, external microphones or the like. Optionally, local hazard warnings such as precipitation and severity may be provided to autonomous or semi-autonomous vehicle controls to aid the autonomous controls in providing safe travel along a road network. One example embodiment that will be described herein includes a user device of a user traveling in a vehicle. Such a device may be a mobile personal device that a user may use within a vehicle and outside of a vehicle environment, while other devices may include a vehicle navigation system. In some embodiments, the mobile personal device may double as a vehicle navigation system. In some embodiments multiple microphones as part of an in-vehicle communications system may allow for beam processing to sense the signal away from other noise sources that may be confused with precipitation. Typically, the use of acoustic beam forming techniques are designed to concentrate on the driver or passenger speaking and eliminate other noise. In this mode, however, the beam forming algorithm may be used to listen away from an occupant in areas that may be more suspectable to noise when precipitation is occurring.

While the term "navigation system" is used herein to describe a device used to present map data, traffic data, etc., it is to be appreciated that such a navigation system can be used via a user interface without providing route guidance information. Route guidance is provided in response to a user entering a desired destination, and where a route between the origin or current location of a user and the destination is mapped and provided to the user. A navigation system may be used in the absence of a discrete destination to provide driver assistance and information.

Example embodiments described herein may provide a user device, navigation system, or advanced driver assistance system (ADAS, described further below) with an indication of a hazardous condition. The indication may be in the form of a warning that may include an alert to a user that adverse weather conditions are present proximate the user. The warning may be generated based on crowd-sourced weather-related information from vehicles, where the vehicles may be configured to report instances of adverse weather, including precipitation. The presence of precipitation in the form of rain, snow, sleet, or hail may be determined by example embodiments of the present disclosure using audio signals captured by one or more audio sensors of a vehicle. According to example embodiments described herein, a severity of the precipitation may also be determined and provided to a user to allow the user to determine any precautionary measures that may be necessary to avoid or prepare for the identified precipitation hazard. An additional acoustic signal may be the detection of nearby hazardous weather warning sirens emitting the characteristic tones to notify nearby people of approaching hazardous weather.

In example embodiments, a navigation system user interface may be provided for driver assistance for a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like.

Autonomous and semi-autonomous vehicles may use HD maps and an understanding of the context (e.g., traffic, weather, road construction, etc.) to help navigate and to control a vehicle along its path. In an instance in which a vehicle is subject to complete or partial autonomous control, hazard warnings such as warnings relating to precipitation and the severity thereof may inform the vehicle enabling appropriate actions to be taken. Those actions may include re-routing to avoid or partially avoid hazardous conditions, or to alter the operational state of the vehicle according to the hazard. Such operational state adjustments may include transitioning from two-wheel-drive to all-wheel-drive, changing the operational state of a traction control system from a dry-condition setting to a wet or snowy/icy condition setting, altering the transmission shift strategy or pattern to use lower gearing, or the like.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for gathering information that may be weather related and/or for presenting weather related information and warnings to a user via a user interface. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), Light Distancing and Ranging (LiDAR) sensor, humidity sensor, image capture sensor, precipitation sensor, accelerometer, and/or gyroscope. Any of the sensors may be used to sense information regarding the movement, positioning, or orientation of the device and for determining a weather condition at the location of the device as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret sensed data as certain weather conditions and establish location based on other sensor data, such as GPS data, for providing weather condition information for a specific location, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

According to certain embodiments, the apparatus 20 may support a mapping or navigation application so as to present maps or otherwise provide navigation or driver assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LIDAR, ultrasonic and/or infrared sensors.

In example embodiments, a user device user interface and/or navigation system user interface may be provided to provide information or driver assistance to a user traveling along a network of roadways. Devices and systems may receive an indication of a current location of the user, and any location based information or hazard warnings associated with the current location of the device and user. While a service provider may be specifically configured to provide local weather or hazard warnings to a user, such a service may be enhanced or improved through cooperation with a map-based service provider. A user in their home may be able to watch television, visit a website on the internet, or listen to a radio station to understand weather patterns and potential hazard warnings at their relatively stationary location. However, when traveling, a user's location may be readily changing and their ability to continually monitor weather conditions or potential hazards may be limited. As such, a navigation system may be an ideal counterpart to a location-based hazard warning system as described herein. It is, however, appreciated that example embodiments described herein can be implemented outside of a navigation system, such as on a user device or other device that may not necessarily also provide navigation services.

According to example embodiments, map service provider database may be used to provide driver assistance via a navigation system. FIG. 2 illustrates a communication diagram of an example embodiment of a system for implementing example embodiments described herein using a navigation system and a map data service provider. The illustrated embodiment of FIG. 2 includes a mobile device 104, which may be, for example, the apparatus 20 of FIG. 1, such as a mobile phone, an in-vehicle navigation system, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data or location-based hazard warning data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region. These vehicles or probes may be embodied by mobile device 104 and may provide data to the map data service provider in the form of traffic speed/congestion data, weather information, location, speed, direction, etc.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

Information regarding a geographic region may be stored in the map database, such as a segmentation of a geographic region into a plurality of "tiles" by overlaying a virtual grid over a region. Each square or rectangular tile within the grid (though it could be any polygon shape, regular or irregular) may include a reference point for the respective tile. In a regular-shaped polygon, that reference point may be a centroid of the tile. The tiles may have any size or area, but may be sized according to a uniform grid for an entire map or region, or may be sized based on a density of map elements, such as points of interest, within a region. Map tiles may include a "level" of granularity or detail, where map tiles may be sized based on various attributes of the mapped region. Further, with respect to hazards that include weather affecting particular regions, the tiles may be sized according to a granularity with which weather can be estimated on a local level. For example, a two-kilometer by two-kilometer square may be a tile size for which weather can be estimated, whether by local sensors within the tile, or based on regional weather radar information. As technology improves, the ability to estimate weather may be performed on a more granular level, such as in tiles with a size of one-half-kilometer by one-half-kilometer, for example.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments. An embodiment implemented as an ADAS may at least partially control autonomous or semi-autonomous features of a vehicle with the assistance of establishing the vehicle.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

Driver assistance information may be communicated to a user via a display, such as a display of user interface 28 of apparatus 20 of FIG. 1. The display may be a display of a mobile phone, or a screen of an in-vehicle navigation system, for example. In the presentation of the driver assistance information to the user it is important that the information is communicated clearly and in an easily understood manner such that a user may quickly understand the information presented. As a user of a navigation system may be driving a vehicle, it is important that the navigation information including driver assistance information is quickly and easily understood, without requiring substantial user interaction should additional information be needed by the driver.

Example embodiments provided herein provide a method of determining the presence of precipitation, and more particularly, for using one or more audio signals from one or more sensors to establish the presence and severity of precipitation at a particular location. Through the determination of the presence of precipitation and the severity thereof, hazardous conditions can be provided to a driver, autonomous vehicle, or weather-related service to define regions where hazardous conditions exist and enable those traveling through those regions to take the necessary precautions.

According to example embodiments described herein, audio signals are captured by one or more audio sensors (e.g., sensor(s) 21 of FIG. 1) to identify sounds that relate to precipitation such as rain. Audio sensors in the form of microphones may be used to capture audio signals at high frequency and be positioned where they are likely to capture audio signals that are informative of the presence of precipitation.

One source of audio signals that can be indicative of precipitation includes windshield wiper blade movement audio. To capture such audio signals, one or more microphones can be positioned inside a vehicle close to the windshield, or outside of a vehicle close to the windshield. Microphones can capture audio signals that are generated when the wiper blades move on the windshield. The sounds captured can include the sound of the wiper blade motor, the squeaky sound of the blade on the glass, and the sound of the blade changing directions at the end of each stroke, for example. The period associated with the sound can reflect the severity of the precipitation. Faster wiper blade speeds (e.g., shorter periods) is generally indicative of heavier and more severe precipitation.

Another source of audio signals that can be indicative of the presence of precipitation is the sound of the precipitation striking the vehicle. Precipitation in the form of rain drops, sleet, or hail striking the windshield, roof, or hood of a vehicle may generate a sound that can be processed to establish the type and severity of the precipitation. Microphones can be positioned inside the vehicle our outside the vehicle close to the windshield to capture the sound of precipitation on the windshield. Further, microphones or vibration sensors can be positioned under a vehicle hood or between a vehicle roof and a headliner of the interior to capture the sounds and vibrations of precipitation striking the roof or the hood of the vehicle. These audio sensors can capture audio signals that are generated when rain drops, sleet pellets, or hail stones strike the surfaces of the vehicle. Heavy precipitation and larger precipitation units (e.g., larger rain drops, larger hail stones, etc.) can be discerned from more intense sounds and higher volume sounds than lighter precipitation.

The presence of precipitation occurring or recently having occurred can be established from the tires of a vehicle. Microphones can be positioned inside a vehicle or within a wheel well of a vehicle to capture audio generated when the tire of the vehicle splashes water on the pavement. For light precipitation or at the very start of a precipitation event, this audio signal may be weak or may not be perceptible. After precipitation subsides, this audio signal may continue to exhibit a sound suggesting a precipitation event. Further, this audio signal could capture audio generated when a vehicle travels through a puddle or road wetted by a non-precipitation source (e.g., sprinkler or fire hydrant). Based on the potential for false positives from this audio signal, the audio captured relating to a wheel splashing through water may not solely be relied upon to identify a precipitation event, but may be used to supplement other signals from the source vehicle or from other vehicles in the same area.

While audio signals may be captured by a candidate vehicle of precipitation as the candidate vehicle experiences the precipitation, audio signals may be captured of other vehicles proximate the candidate vehicle. Microphones can be positioned on a vehicle to capture audio signals generated by nearby vehicles as they splash water on the pavement or as precipitation strikes nearby vehicles. This audio source may have similar deficiencies as the audio captured of a candidate vehicle's tires splashing on a road surface; however, the presence of other vehicles also splashing along a road surface can reinforce audio signals from the candidate vehicle. Capturing audio of precipitation striking nearby vehicles, such as on a windshield, roof, or hood, can be useful to determine a scale of precipitation event and be useful to help discern false precipitation events. For example, a sprinkler striking one vehicle but not a nearby vehicle may be indicative of a non-precipitation event that could be perceived by a single vehicle as a precipitation event. If nearby vehicles aren't experiencing the precipitation, the audio signals from a candidate vehicle may be determined to be highly-localized and unlikely to be precipitation.

Using audio signals from a candidate vehicle to capture sounds generated by precipitation may identify the presence of precipitation and a severity thereof. Location information from a candidate vehicle can be used to localize the identified precipitation. Location information may be generated based on a global navigation satellite system (GNSS), global positioning system, a global positioning system (GPS, GLONASS Galileo, Beidou), wireless fingerprinting, or other means for locating a vehicle.

Audio signals are extracted from the different audio sources described above such that acoustic features and attributes on frequency and amplitude can be extracted. This feature extraction is performed during heavy precipitation, light precipitation, and times when there is no precipitation. This data collection provides positive and negative samples of acoustic features and actual environmental conditions. Collecting and extracting these audio signals enables a baseline to be established for conditions ranging from no precipitation to heavy precipitation. For example, during times of no precipitation, baseline audio signals can capture ambient noise from a vehicle including tire noise as it travels along different surfaces such that ambient road noise on a dry road is not later interpreted as precipitation.

Embodiments described herein employ an algorithm that uses the amplitude and frequency of audio signals from a candidate vehicle as inputs and the algorithm can determine whether the candidate vehicle is experiencing heavy precipitation, light precipitation, or no precipitation. The algorithm may also generate a confidence value indicative of the confidence with which the output is made. If the confidence is high and close to 100%, the results are trustworthy. Confidences below a predetermined value (e.g., below 80%) may not be trustworthy on their own, and may require validation through other signals from the candidate vehicle, through signals generated by other vehicles, or by other sources such as weather and radar reports. The confidence level may be established based on how distinctive the audio signals are from the various sensors of the various types of audio collected.

The confidence level of an output from the algorithm identifying the presence or lack thereof of precipitation increases with the number of signals processed by the algorithm. For example, initially as rain begins to fall and only a few drops strike a windshield, the confidence may be low, such as 20%. An audio signal from the windshield wiper may increase the confidence as it supplements the rain drop audio captured from the windshield. Detecting rain drop audio on the windshield and windshield wiper audio may increase the confidence, such as to 40%. Additional signals may further increase the confidence level. For example, if audio signals of the vehicle's tires splashing along the roadway is detected, the confidence may increase further, such as to 70%. If audio signals reveal that other nearby vehicles are also splashing along the roadway, the confidence may increase beyond 90%. The confidence levels based on the additive signals may be variable and configurable, such that if a specific signal is determined to be highly reliable (e.g., a windshield wiper), that signal may have a greater contribution and be afforded a higher weight with respect to the confidence level.

An algorithm according to example embodiments described herein may include as inputs the audio signals from a candidate vehicle of sounds within and around the vehicle. The processing of the audio signals includes audio signal outlier rejection, audio signal integration of the different input sources, and a confidence computation. The output provides an indication of the presence or absence of precipitation, the severity of the precipitation in the presence of precipitation, and a confidence rating of the presence/severity or absence.

According to an example embodiments of a rule-based algorithm: if the number of audio signals indicating precipitation is zero, the absence of precipitation is determined with relatively high confidence. If an audio signal associated with a windshield wiper indicates the wipers are active but at a relatively slow speed, and an audio signal associated with a windshield detects a sound of rain striking the windshield, while audio signals associated with a tire do not indicate a splashing noise, a determination of light rain may be made.

If audio signals from the windshield wipers, windshield, and tires all indicate precipitation, a determination of heavier precipitation may be made.

According to some embodiments, an advanced machine learning algorithm may be employed in addition to or instead of a rule-based algorithm. Using historical data on heavy precipitation, light precipitation, and no precipitation, the audio features on frequency and amplitude can be extracted as described above. This dataset of output labels and input audio features is established as ground truth data (e.g., known to be true and accurate) and can be used to train a machine learning model (e.g., Random Forest) to automatically predict heavy precipitation, light precipitation, and no precipitation given the input signals.

The machine learning model of example embodiments may learn the audio signatures of heavy precipitation, light precipitation, and no precipitation automatically from the training samples. Further, embodiments may be configured to learn precipitation types from training data, such as to distinguish between rain, hail, sleet, snow, etc. Other sensors may be employed to distinguish or discern the precipitation type, such as a temperature and humidity sensors. For example, if splashing is heard from the tires and windshield wipers are active while the temperature is below 38 degrees Fahrenheit and no audio signals suggest raindrops striking the windshield, a determination may be made that it is snowing. Given the trained machine learning model, the audio features may then be captured in real time as a candidate vehicle drives and the audio features are passed to the already trained machine learning model. The machine learning model can then determine the type and severity of any precipitation.

Vehicle features may be considered in establishing the presence, absence, or severity of any precipitation. Windshield wiper blades of a vehicle can be manually activated or automatically. For manual activation of the wiper blade by a human, an audible "click" may be generated as the user switches the wiper blade on or off. This "click" may be used as input to an algorithm for establishing precipitation presence. For automatic activation, a rain sensor detects rain drops on the windshield and triggers the wiper blade. Usage of the rain sensor for automated wiper activation may not provide an audio signature. Embodiments may be vehicle-specific or use vehicle model as an input to an algorithm as described herein or use vehicle model (including sensor capabilities) as a basis for configuring algorithms of example embodiments.

Embodiments described herein may optionally be configured to determine false positive indications of precipitation. False positive audio signals may be detected by correlating the different audio signals. For example, the sound of water splashing on pavement but not falling on the windshield could be a potential false positive of the presence of precipitation. The water splashing may be a puddle, prior precipitation, or other water source with no active precipitation. If the temperature is below a predefined threshold, the presence of audible splashing while lacking audible rain drops on the surfaces of the vehicle may be indicative of snow, such that other signals may be considered including wiper blade noise. Further, the audible "click" of engaging windshield wipers may be similar to an audible click for headlights or turn signal switching, such that other signals may be considered such as the sound of wiper blades within a predetermined time after detecting an audible "click" to indicate wiper blade activation.

The use of audio signals to detect the presence or absence of precipitation along with the severity and a confidence level may be performed by an algorithm executed by the candidate vehicle using the audio signals as inputs. The output of the algorithm may be sent to a service, such as the map data service provider/cloud 108 of FIG. 2. The map data service provider may provide local hazard warnings to other service providers and to users and vehicles in the vicinity of the local hazard (e.g., precipitation) or if the local hazard is along a planned route for a vehicle.

A map data service provider may aggregate data relating to the presence of precipitation, the severity, and the confidence from a plurality of vehicles within a geographic region. While a single vehicle may report a low confidence of precipitation, if that report is combined with a plurality of other vehicles in the same area reporting precipitation with a low confidence, the combined reports may become a reliable indication of precipitation. The aggregated data from a plurality of vehicles may be used to plot areas on a map of where precipitation exists, and how it progresses. Mapping the reports of precipitation over time may enable predictive mapping of where precipitation is going to be, and thus recognize a potential increase in the likelihood of precipitation reports in an area. If precipitation is moving across an area, and a future location is predicted by a map service provider based on precipitation reports from vehicles, a low-confidence report of precipitation from a vehicle in the path of imminent precipitation may have the confidence level increased by the map service provider.

Embodiments provided herein may employ vehicle data reporting precipitation conditions, precipitation severity, and confidence values relating to the precipitation conditions along with independent weather information from weather stations and/or radar to establish the quality of the reported precipitation conditions. The weather conditions from the third party may be used to evaluate local hazard warnings (LHW) reported by vehicles to establish the quality thereof. Areas of a region for which a local hazard condition exists are extracted from vehicle data and compared against data from available weather data to measure quality.

The confidence measure of precipitation and precipitation severity of example embodiments described herein may be used to determine a response to the detected precipitation. For example, a vehicle traveling within a road network to a destination may have a route extending through a region corresponding to high-confidence reports of heavy precipitation. In response to receiving a confidence measure of the precipitation conditions, actions may optionally be taken. If the confidence measure is high with respect to a rain condition in an area, an action of a user or of an autonomous vehicle may be to take extra precautions while traversing the area. For instance, a vehicle operational state may be changed, such as a speed of travel may be reduced, a traction control system may become more sensitive, power distribution to the wheels may be changed (e.g., a front-wheel power bias relative to the rear wheels), the vehicle may transition from two-wheel-drive to all-wheel-drive, etc. In an instance in which a precipitation condition is detected and the area associated with the precipitation condition has heavy traffic or is historically unsafe in hazardous conditions, a vehicle may be instructed to avoid the area. Such instructions may be provided to a user via a navigation system, or interpreted by an autonomous vehicle to alter a route, for example. Optionally, in response to establishing that a route of an autonomous vehicle traverses an area corresponding to a precipitation condition, autonomous vehicle control may be limited or ended with manual control returned to the driver who may be better equipped to handle the adverse conditions.

Embodiments described herein provide a confidence measure that may influence how a precipitation condition in an area is processed by a navigational system or autonomous vehicle control system. In this manner, a user may be presented with an alert to a precipitation condition in an area and a confidence measure of the data supporting the precipitation condition alert. The user may be presented with an option to take action with respect to the precipitation condition, or not. This decision may be influenced by the confidence measure of the data, and a user may optionally take into consideration current context of the vehicle, such as if it is apparent that a precipitation condition is likely (e.g., if storm clouds are visible). Similarly, an autonomous vehicle may use the confidence measure of information with respect to a precipitation condition in an area to determine what actions may be taken responsive to the information. A threshold may be set, either manually by a user or by the autonomous vehicle control system, below which no action is taken in response to a low confidence precipitation condition for an area, or above which action may be taken in response to a high confidence precipitation condition for an area.

Further, there may be multiple thresholds, where different actions are taken based on the confidence measure of the precipitation condition in an area. For example, a precipitation condition identified with moderate confidence (e.g., between 30% and 70%) may result in some actions taken, while different, more substantial actions may be taken by an autonomous vehicle controller or a user in response to a higher confidence of information pertaining to the precipitation condition.

FIG. 3 is a flowchart illustrative of methods according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 3 illustrates a flowchart of a method for using one or more audio signals from one or more sensors to establish the presence and severity of precipitation at a particular location. According to the illustrated embodiment, at least one first audio signal is received from a first audio sensor of a vehicle as shown at 210. The first audio sensor may include sensor 21 of the apparatus 20 of FIG. 1, and may be a sensor to discern sounds from a wheel of a vehicle, a windshield of a vehicle, or other surfaces of a vehicle. Acoustical features including frequency and amplitude are extracted from the at least one first audio signal at 220. At least one second audio signal is received from a second audio sensor of a vehicle at 230. Acoustical features including frequency and amplitude are extracted from the at least one second audio signal at 240. The frequency and amplitude of the at least one first audio signal and the frequency and amplitude of the at least one second audio signal are processed as inputs to an algorithm to generate an output of the algorithm at 250. Based on the output of the algorithm, a precipitation condition and a confidence measure of the precipitation condition are determined at 260.

In an example embodiment, an apparatus for performing the methods of FIG. 3 above may comprise a processor (e.g., the processor 24) configured to perform some or each of the operations (210-260) described above. The processor may, for example, be configured to perform the operations (210-260) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 210-260 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
receive at least one first audio signal from a first audio sensor of a vehicle;
extract acoustical features comprising frequency and amplitude from the at least one first audio signal;
receive at least one second audio signal from a second audio sensor of the vehicle;
extract acoustical features comprising frequency and amplitude from the at least one second audio signal;
process the frequency and amplitude from the at least one first audio signal and the frequency and amplitude from the at least one second audio signal as inputs to an algorithm to generate an output from the algorithm;
determine, from the output of the algorithm, a precipitation condition and a confidence measure of the precipitation condition, wherein the confidence measure of the precipitation condition is determined based, at least in part, on a combination of the at least one first audio signal and the at least one second audio signal;
cause validation of the output of the algorithm by comparison with at least one additional signal in response to the confidence measure failing to satisfy a predetermined level; and
provide for a change in an operational state of the vehicle in response to the determination of the precipitation condition.

2. The apparatus of claim 1, wherein the apparatus is further caused to:
determine a location of the vehicle; and
identify an area of the precipitation condition based on the location of the vehicle.

3. The apparatus of claim 1, wherein the operational state of the vehicle comprises at least one of a traction control sensitivity or a power distribution to wheels of the vehicle.

4. The apparatus of claim 1, wherein the apparatus is further caused to:
determine, from the output of the algorithm, a severity measure of the precipitation condition.

5. The apparatus of claim 4, wherein the apparatus is further caused to:
transmit an indication of the precipitation condition and the severity measure of the precipitation condition together with a location of the precipitation condition to a service provider in response to the confidence measure satisfying a predetermined level.

6. The apparatus of claim 1, wherein the at least one additional signal comprises at least one of the following:
an audio signal from the vehicle;
a signal generated by another vehicle; and/or
a report by a service provider such as weather and radar.

7. A computer program product comprising at least one non-transitory computer-readable storage medium having computer-executable program code instructions stored therein, the computer-executable program code instructions comprising program code instructions to:
receive at least one first audio signal from a first audio sensor of a vehicle;
extract acoustical features comprising frequency and amplitude from the at least one first audio signal;
receive at least one second audio signal from a second audio sensor of the vehicle;
extract acoustical features comprising frequency and amplitude from the at least one second audio signal;
process the frequency and amplitude from the at least one first audio signal and the frequency and amplitude from the at least one second audio signal as inputs to an algorithm to generate an output from the algorithm;
determine, from the output of the algorithm, a precipitation condition and a confidence measure of the precipitation condition, wherein the confidence measure of the precipitation condition is determined based, at least in part, on a combination of the at least one first audio signal and the at least one second audio signal;
cause validation of the output of the algorithm by comparison with at least one additional signal in response to the confidence measure failing to satisfy a predetermined level; and
provide for a change in an operational state of the vehicle in response to the determination of the precipitation condition.

8. The computer program product of claim 7, further comprising program code instructions to:
determine a location of the vehicle; and
identify an area of the precipitation condition based on the location of the vehicle.

9. The computer program product of claim 7, wherein the operational state of the vehicle comprises at least one of a traction control sensitivity or a power distribution to wheels of the vehicle.

10. The computer program product of claim 7, further comprising program code instructions to:
determine, from the output of the algorithm, a severity measure of the precipitation condition.

11. The computer program product of claim 10, further comprising program code instructions to:
transmit an indication of the precipitation condition and the severity measure of the precipitation condition together with a location of the precipitation condition to a service provider in response to the confidence measure satisfying a predetermined level.

12. The computer program product of claim 7, wherein the at least one additional signal comprises at least one of the following:
an audio signal from the vehicle;
a signal generated by another vehicle; and/or
a report by a service provider such as weather and radar.

13. A method comprising:
receiving at least one first audio signal from a first audio sensor of a vehicle;
extracting acoustical features comprising frequency and amplitude from the at least one first audio signal;
receiving at least one second audio signal from a second audio sensor of the vehicle;
extracting acoustical features comprising frequency and amplitude from the at least one second audio signal;
processing the frequency and amplitude from the at least one first audio signal and the frequency and amplitude from the at least one second audio signal as inputs to an algorithm to generate an output from the algorithm;
determining, from the output of the algorithm, a precipitation condition and a confidence measure of the precipitation condition, wherein the confidence measure of the precipitation condition is determined based, at least in part, on a combination of the at least one first audio signal and the at least one second audio signal;
causing validation of the output of the algorithm by comparison with at least one additional signal in response to the confidence measure failing to satisfy a predetermined level; and
providing for a change in an operational state of the vehicle in response to the determination of the precipitation condition.

14. The method of claim 13, further comprising:
   determining a location of the vehicle; and
   identifying an area of the precipitation condition based on the location of the vehicle.

15. The method of claim 13, wherein the operational state of the vehicle comprises at least one of a traction control sensitivity or a power distribution to wheels of the vehicle.

16. The method of claim 13, further comprising:
   determining, from the output of the algorithm, a severity measure of the precipitation condition.

17. The method of claim 16, further comprising:
   transmitting an indication of the precipitation condition and the severity measure of the precipitation condition together with a location of the precipitation condition to a service provider in response to the confidence measure satisfying a predetermined level.

* * * * *